(12) United States Patent
Gu et al.

(10) Patent No.: US 11,144,562 B1
(45) Date of Patent: Oct. 12, 2021

(54) METHOD AND APPARATUS OF INDICATOR INFORMATION DETERMINATION

(71) Applicant: Shanghai IceKredit, Inc., Shanghai (CN)

(72) Inventors: Lingyun Gu, Shanghai (CN); Zhipan Guo, Shanghai (CN); Wei Wang, Shanghai (CN); Haiquan Li, Shanghai (CN); Anwei Jiang, Shanghai (CN)

(73) Assignee: Shanghai IceKredit, Inc., Shanghai (CN)

( * ) Notice: Subject to any disclaimer, the term of this patent is extended or adjusted under 35 U.S.C. 154(b) by 0 days.

(21) Appl. No.: 17/228,961

(22) Filed: Apr. 13, 2021

(30) Foreign Application Priority Data

May 26, 2020 (CN) .......................... 202010452110.7

(51) Int. Cl.
*G06F 16/2458* (2019.01)
*G06F 16/2455* (2019.01)
*G06F 16/248* (2019.01)
*G06F 16/901* (2019.01)

(52) U.S. Cl.
CPC ........ *G06F 16/2471* (2019.01); *G06F 16/248* (2019.01); *G06F 16/24565* (2019.01); *G06F 16/9024* (2019.01)

(58) Field of Classification Search
CPC ........... G06F 16/2471; G06F 16/24565; G06F 16/248; G06F 16/9024
See application file for complete search history.

(56) References Cited

U.S. PATENT DOCUMENTS

| 10,606,570 B2 * | 3/2020 | Yoshida ................. G06F 8/427 |
| 2017/0091293 A1 | 3/2017 | Cummings et al. |
| 2020/0050605 A1 * | 2/2020 | Tung ................... G06F 16/9024 |

FOREIGN PATENT DOCUMENTS

| CN | 104268428 A | 1/2015 |
| CN | 107092635 A | 8/2017 |

OTHER PUBLICATIONS

First Office Action in counterpart Chinese Patent Application No. 202010452110.7, dated Jul. 9, 2020.

* cited by examiner

*Primary Examiner* — Jorge A Casanova
(74) *Attorney, Agent, or Firm* — Westbridge IP LLC

(57) ABSTRACT

Disclosed are a method of indicator information determination and an apparatus of indicator information determination. Firstly, configuration information in json format is obtained and a query path list is generated based on the configuration information. Secondly, a script file is generated according to a constraint condition of the information nodes corresponding to the query path and stored in a first database server. Then, according to a third identification information of the query request input by a terminal device, a target script file corresponding to a fourth identification information is searched in the first database server, then the target script file is executed in the second database server to obtain a query result.

8 Claims, 3 Drawing Sheets

METHOD AND APPARATUS OF INDICATOR INFORMATION DETERMINATION

CROSS REFERENCE TO RELATED APPLICATIONS

The present disclosure claims the priority of Chinese Patent application No. 202010452110.7, filed on May 26, 2020 and entitled "Method and Apparatus of Indicator Information Determination", which is hereby incorporated by reference in its entirety.

TECHNICAL FIELD

The present disclosure relates to the technical field of information query of graph analysis technology, in particular, to a method of indicator information determination and an apparatus of indicator information determination.

BACKGROUND

When querying (determining) the information of graph analysis indicators based on the graph database, the user needs to write the corresponding query statement based on the query requirements, and the query statement is then executed through the database to obtain the information queried. This requires users to have the ability to write query statements of various types of databases (such as Mysql database and JanusGraph database), it may make it difficult for most users who do not have the ability to write query statements to quickly query graph analysis indicator information through the graph database.

SUMMARY

In order to solve the above problem, the present disclosure provides a method of indicator information determination and an apparatus of indicator information determination.

A first aspect of some embodiments of the present disclosure provides a method of indicator information determination, which is applied to a server communicating with a browser, and the method includes:

acquiring configuration information sent by the browser, where the configuration information is obtained by the browser performing data format conversion on indicator information entered by a user, and a data format of the configuration information is json format;

searching whether a second identification information that is the same as a first identification information in the configuration information exists in a first database server;

when the second identification information does not exist in the first database server, generating a query path list according to information nodes in the configuration information and connection relationship of the information nodes, where the query path list includes a plurality of elements, each of the plurality of elements characterizes a query path, and each query path includes a plurality of interconnected information nodes;

generating a script file corresponding to each query path according to a constraint condition of each information node corresponding to each query path, and storing the script file in the first database server, where each script file corresponds to an identification information; and receiving a query request input by a terminal device, searching whether a fourth identification information that is the same as a third identification information of the query request exist in the first database server, when the fourth identification information exists in the first database server, executing a target script file corresponding to the fourth identification information in a second database server to obtain a query result corresponding to the third identification information, and returning the query result to the terminal device, wherein the query result comprises indicator information corresponding to the third identification information.

Further, the method further includes:

when the second identification information exists in the first database server, sending an error prompt message to the browser.

Further, generating a query path list according to information nodes in the configuration information and connection relationship of the information nodes includes:

determining an information node with a setting node identification in the configuration information as an initial information node, where the initial information node is connected through a plurality of directed edges;

traversing a downstream information node corresponding to each of the plurality of directed edges of the initial information node, and obtaining a plurality of traversal paths corresponding to the initial information node; and integrating the plurality of traversal paths to obtain the query path list.

Further, generating a script file corresponding to each query path according to a constraint condition of each information node corresponding to each query path includes:

determining a constraint condition corresponding to a directed edge of each information node corresponding to each query path, where the constraint condition includes a filter condition, a filter function and a filter logic configured for filtering the information nodes; and acquiring a comparison result of a constraint condition between each two adjacent information nodes corresponding to each query path, and generating a cypher script corresponding to each query path based on the comparison result.

Further, executing a target script file corresponding to the fourth identification information in a second database server to obtain a query result corresponding to the third identification information includes:

acquiring a first thread information configured for generating the cypher script and a second thread information of a script execution thread of the second database server;

extracting respectively a first thread parameter set of the first thread information and a second thread parameter set of the second thread information, where the first thread parameter set and the second thread parameter set both include a plurality of thread parameters with different response times;

acquiring a parameter correlation of any thread parameter of the first thread parameter set, and determining a thread parameter with a minimum response time in the second thread parameter set as a reference parameter, where the parameter correlation is configured for characterizing an influence weight of the thread parameter in the first thread parameter set;

calculating a mapping correlation of the parameter correlation with respect to the reference parameter, and generating compensation information between the first thread information and the second thread information for thread pairing based on the parameter correlation and the mapping correlation;

determining a first mapping file of the target script file in the first thread information, and taking the compensation information to compensate the first mapping file to obtain a second mapping file; and importing the second mapping file into the script execution thread of the second database server to run the script execution thread by the second database server, and obtaining the query result corresponding to the third identification information, where the second database server is a JanusGraph database.

A second aspect of some embodiments of the present disclosure provides an apparatus of indicator information determination, which is applied to a server communicating with a browser, and the apparatus includes:

an information acquirer configured for acquiring configuration information sent by the browser, where the configuration information is obtained by the browser performing data format conversion on indicator information entered by a user, and a data format of the configuration information is json format;

an identifier searcher configured for searching whether a second identification information that is the same as a first identification information in the configuration information exists in a first database server;

a list generator configured for when the second identification information does not exist in the first database server, generating a query path list according to information nodes in the configuration information and connection relationship of the information nodes, where the query path list includes a plurality of elements, each of the plurality of elements characterizes a query path, and each query path includes a plurality of interconnected information nodes;

a script file generator configured for generating a script file corresponding to each query path according to a constraint condition of each information node corresponding to each query path, and storing the script file in the first database server, where each script file corresponds to an identification information; and an indicator determiner configured for receiving a query request input by a terminal device, searching whether a fourth identification information that is the same as a third identification information of the query request exists in the first database server, when the fourth identification information exists in the first database server, executing a target script file corresponding to the fourth identification information in a second database server to obtain a query result corresponding to the third identification information, and returning the query result to the terminal device, wherein the query result comprises indicator information corresponding to the third identification information.

Further, the identifier searcher is further configured for:
when the second identification information exists in the first database server, sending an error prompt message to the browser.

Further, the list generator is further configured for:
determining an information node with a setting node identification in the configuration information as an initial information node, where the initial information node is connected through a plurality of directed edges;

traversing a downstream information node corresponding to each of the plurality of directed edges of the initial information node, and obtaining a plurality of traversal paths corresponding to the initial information node; and integrating the plurality of traversal paths to obtain the query path list.

Further, the script file generator is further configured for:
determining a constraint condition corresponding to a directed edge of each information node corresponding to each query path, where the constraint condition includes a filter condition, a filter function and a filter logic configured for filtering the information nodes; and acquiring a comparison result of a constraint condition between each two adjacent information nodes corresponding to each query path, and generating a cypher script corresponding to each query path based on the comparison result.

Further, the indicator determiner is further configured for:
acquiring a first thread information configured for generating the cypher script and a second thread information of a script execution thread of the second database server;

extracting respectively a first thread parameter set of the first thread information and a second thread parameter set of the second thread information, where the first thread parameter set and the second thread parameter set both include a plurality of thread parameters with different response times;

acquiring a parameter correlation of any thread parameter of the first thread parameter set, and determining a thread parameter with a minimum response time in the second thread parameter set as a reference parameter, where the parameter correlation is configured for characterizing an influence weight of the thread parameter in the first thread parameter set;

calculating a mapping correlation of the parameter correlation with respect to the reference parameter, and generating compensation information between the first thread information and the second thread information for thread pairing based on the parameter correlation and the mapping correlation;

determining a first mapping file of the target script file in the first thread information, and taking the compensation information to compensate the first mapping file to obtain a second mapping file; and importing the second mapping file into the script execution thread of the second database server to run the script execution thread by the second database server, and obtaining the query result corresponding to the third identification information, where the second database server is a JanusGraph database.

In performing the above scheme, firstly, configuration information in a json format sent by a browser is obtained, then it is determined whether the configuration information is duplicated based on a first database server and a first identification information in the configuration information, in a determination that the configuration information is not duplicated, a query path list is generated based on information nodes and their connection relationship. Secondly, a script file is generated according to a constraint condition of the information node corresponding to the query path and stored in the first database server. Then, according to a third identification information of the query request input by a terminal device, a target script file corresponding to a fourth identification information is searched in the first database server, then the target script file is executed in the second database server to obtain a query result. In this way, the script file corresponding to a query statement is determined based on the configuration file in advance, and the user does not need to write the query statement by himself. In this way, the script file in the first database server can be executed in the second database server directly according to the identification information in the user's query request to obtain the query result, thus ensuring that users who do not have the ability to write query statements can also quickly query graph analysis indicator information through the graph database.

BRIEF DESCRIPTION OF THE DRAWINGS

In order to more clearly describe the technical solutions in the embodiments of the present disclosure, the following will briefly introduce the drawings that need to be used in the description of the embodiments. It should be understood that, the following drawings only show some embodiments of the present disclosure, and therefore should not be regarded as a limitation of the scope. For those of ordinary skill in the art, without creative work, other relevant drawings may also be obtained based on these drawings.

DETAILED DESCRIPTION OF THE EMBODIMENTS

In order to better understand the above technical scheme, the technical scheme of the present disclosure is described in detail below through the drawings and specific embodiments. It should be understood that the embodiments of the present disclosure and the specific features in the embodiments are the detailed description of the technical scheme of the present disclosure, rather than the limitation of the technical scheme of the present disclosure. In the case of no conflict, the embodiments of the present disclosure and the technical features in the embodiments may be combined with each other.

Figure 1:
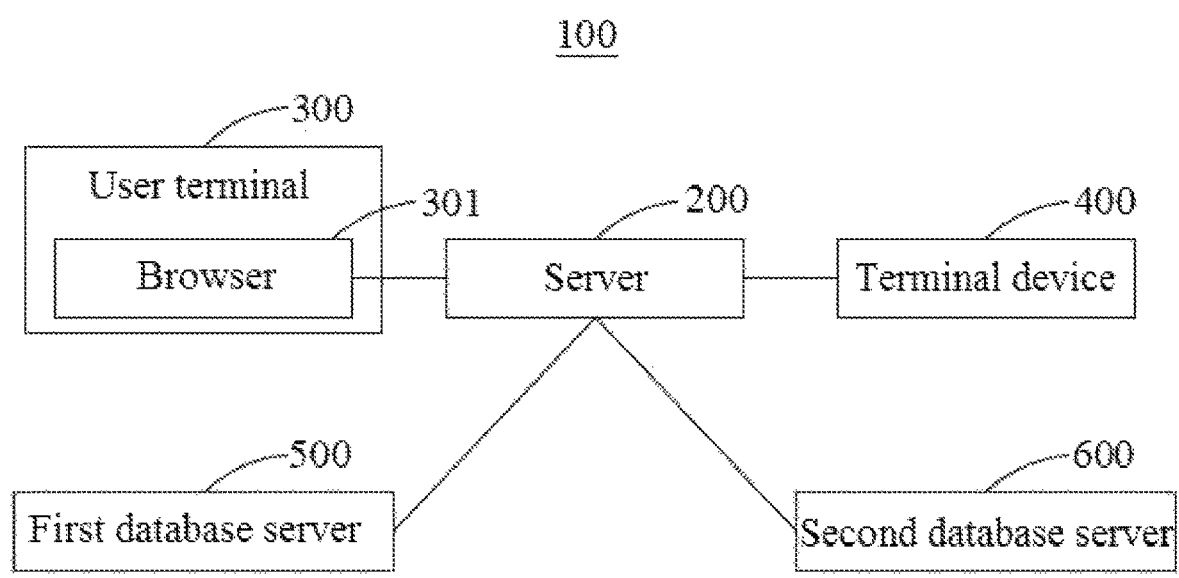
FIG. 1 is a communication connection diagram of an information query system according to an embodiment of the present disclosure.

FIG. 1 is a communication connection diagram of an information query system 100 according to an embodiment of the present disclosure. The information query system 100 includes a server 200, a user terminal 300, a terminal device 400, a first database server 500, and a second database server 600. Where, the terminal device 400, the first database server 500, the second database server 600, and a browser 301 installed in the user terminal 300 all communicate with the server 200.

In this embodiment, the user terminal 300 and the terminal device 400 may be electronic devices with communication functions such as mobile phones, tablets or notebook computers, which are not limited here. The first database server 500 may be a server of Mysql database, and the second database server 600 may be a server of JanusGraph (graph database).

When applying the above information query system 100, the script file corresponding to a query statement can be determined based on the configuration file in advance, and the user does not need to write the query statement by himself. In this way, the script file in the first database server can be executed in the second database server directly according to the identification information in the user's query request to obtain the query result. Thus ensuring that users who do not have the ability to write query statements can also quickly query graph analysis indicator information through the graph database.

Figure 2:
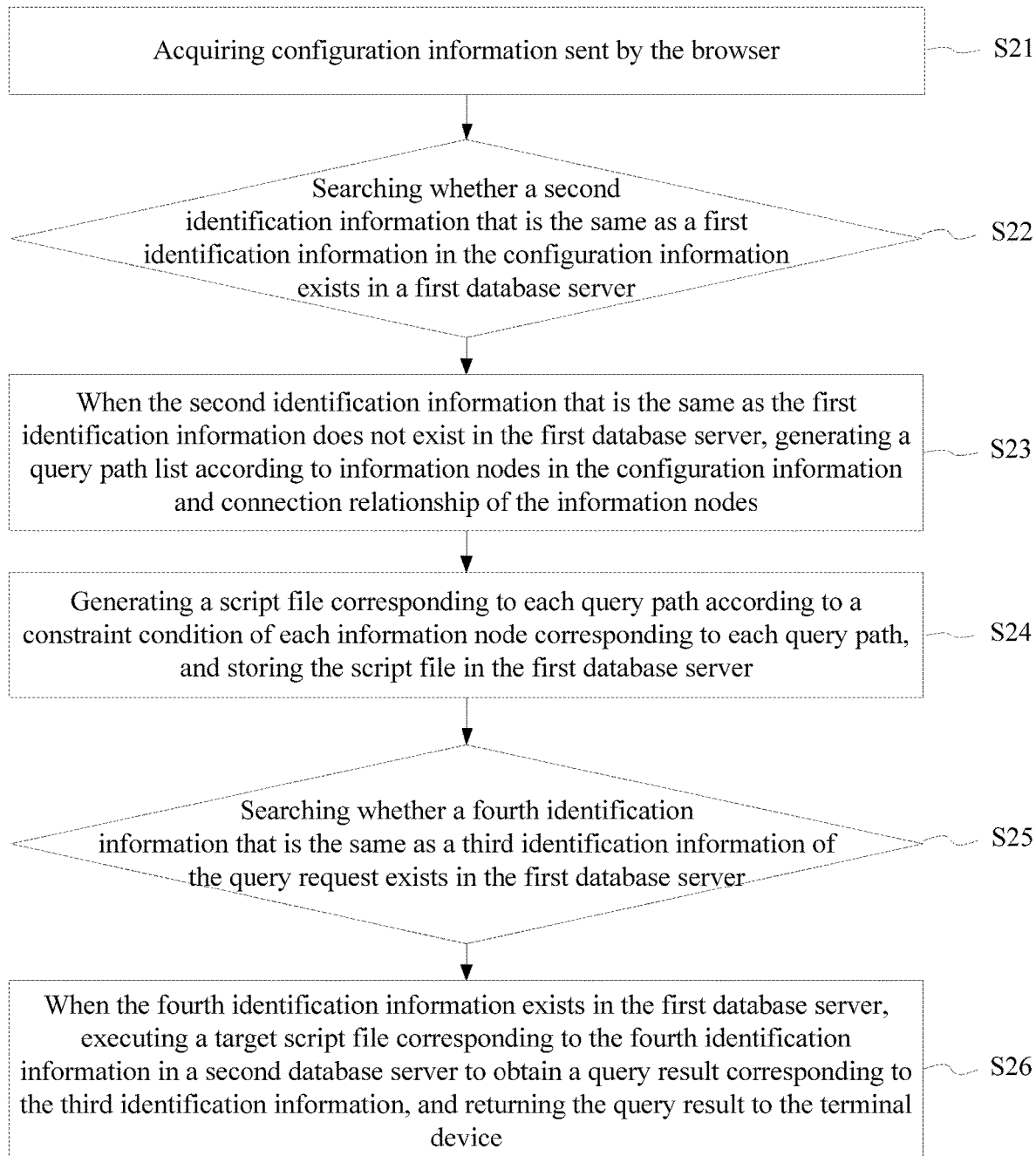
FIG. 2 is a flowchart of a method of indicator information determination according to an embodiment of the present disclosure.

FIG. 2 is a flowchart of a method of indicator information determination according to an embodiment of the present disclosure. The method can be applied to the server 200 in FIG. 1, and the server 200 is configured to perform the following operations when implementing the method.

S21: Acquiring configuration information sent by the browser.

In this embodiment, the configuration information is obtained by the browser 301 performing data format conversion on indicator information entered by a user, and a data format of the configuration information is json format.

Where, the indicator information can be Chinese name, English name, dimension, entity, relationship, input parameter, output parameter, etc.

In this embodiment, information content of the configuration information in the json format may be different. The following example gives the information content of one of the configuration information in json format. Certainly, the specific implementation is not limited to the following examples.

```
{
"name": "work_count", // English name
"chineseName": "number of posts", // Chinese name
"resultAggregate": {result aggregation
   "aggregateFunction": "count", aggregate function
   "propertyKey": " " aggregate key
},
"inFieldConfigList": [input parameter configuration
   {
      "propertyKey": "name", the database field passes in the
         mapping name
      "propertyName": "name",
      "inField": "companyName" interface passes in parameter name
   }
],
"nodeList": [node list
   {
      "id": "1 ",
      "label": "Company",
      "nodeType": "START", node type
      "propertyFilterGroupList": [node attribute filtering criteria
         {
            "filterLogic": "AND", the filtering logic has and or
            "propertyFilterList": [
               {
                  "propertyKey": "Company#name", filter condition
                  "rule": "TextP .containing", filter function
                  "paraType": "CONSTANT", variable type
                  "targetValue": [variable value
                     "Company"
                  ],
                  "targetId": null,
                  "targetPropertyKey": null
               }
            ]
         }
      ]
   },
   {
      "id": "2"
      "label": "Person ",
      "nodeType": "END",
      "propertyFilterGroupList": [ ],
      "description": "person"
   }
],
"edgeList": [Edge list
   {
      "id": "3"
      "label": "WORK_IN ",
      "sourceNodeId": "2 ",
      "targetNodeId": "1",
      "propertyFilterGroupList": [ ] ,
      "description": "1"
   }
]
}
```

S22: Searching whether a second identification information that is the same as a first identification information in the configuration information exists in a first database server.

In this embodiment, the first identification information in the configuration information may be an English name "name" or a Chinese name "chineseName". By determining whether the first identification information is duplicated with the second identification information, script processing of duplicate configuration information can be avoided.

On the one hand, if there is a second identification information in the first database server 500 that is the same as the first identification information, the server 200 sends an error prompt message to the browser 301 to indicate that the indicator information entered by the user is duplicated with the indicator information in the first database server 500. On the other hand, if the second identification information, which is the same as the first identification information, does not exist in the first database server 500, the process proceeds to S23.

S23: When the second identification information that is the same as the first identification information does not exist in the first database server 500, generating a query path list according to information nodes in the configuration information and connection relationship of the information nodes.

In this embodiment, the query path list includes a plurality of elements, each of the plurality of elements characterizes a query path, and each query path includes a plurality of interconnected information nodes.

S24: Generating a script file corresponding to each query path according to a constraint condition of each information node corresponding to each query path, and storing the script file in the first database server.

In this embodiment, each script file corresponds to an identification information.

S25: Receiving a query request input by a terminal device, searching whether a fourth identification information that is the same as a third identification information of the query request exists in the first database server.

S26: When the fourth identification information that is the same as a third identification information of the query request exists in the first database server, executing a target script file corresponding to the fourth identification information in a second database server to obtain a query result corresponding to the third identification information, and returning the query result to the terminal device.

In this embodiment, the user may pass in a query request to the server 200 through the terminal device 400, and the query request is used for index calculation. For example, the query request may be "Company A's annual performance report", and the third identification information of the query request may be "Company A" and "annual performance report".

In the above case, if there is a fourth identification information in the first database server 500 that is the same as the third identification information, the server 200 acquires the target script file corresponding to the fourth identification information, then the target script file is executed in the second database server 600 to obtain visual query results. Understandably, the target script file can be used to characterize the query statement for querying company A's annual performance report. The server 200 can directly call the target script file for query, so there is no need for the user to manually write query statements through the terminal device 400, which reduces the requirements for users to query using the database.

Thus, in the implementation of the above scheme:

firstly, configuration information in a json format sent by a browser is obtained, then it is determined whether the configuration information is duplicated based on a first database server and a first identification information in the configuration information, in a determination that the configuration information is not duplicated, a query path list is generated based on information nodes and their connection relationship;

secondly, according to the constraints of the information node corresponding to the query path, the script file is generated and stored in the first database server; and then, according to a third identification information of the query request input by a terminal device, a target script file corresponding to a fourth identification information is searched in the first database server, then the target script file is executed in the second database server to obtain a query result.

In this way, the script file corresponding to a query statement is determined based on the configuration file in advance, and the user does not need to write the query statement by himself. In this way, the script file in the first database server can be executed in the second database server directly according to the identification information in the user's query request to obtain the query result. Thus ensuring that users who do not have the ability to write query statements can also query information through the database.

In an alternative embodiment, in the above operation S23, the query path list can be obtained by the described content in the following operations S231-S233, and the specific description is as follows.

S231: Determining an information node with a setting node identification in the configuration information as an initial information node.

In this embodiment, the initial information node is connected by directed edges, each directed edge is configured to characterize the upstream and downstream relationship between the information nodes, where nodes and directed edges are commonly used in graph analysis techniques.

S232: Traversing a downstream information node corresponding to each of the plurality of directed edges of the initial information node, and obtaining a plurality of traversal paths corresponding to the initial information node.

S233: Integrating the plurality of traversal paths to obtain the query path list.

In this embodiment, the information node corresponding to the setting node identification is the initial information node. In combination with the above-mentioned configuration file in json format, the setting node identification can be "START".

When determining the query path list, first find the initial information node and then traverse all directed edges of the initial information node, then the other node connected by each directed edge of the initial information node is taken as the starting node to continue traversing until all information nodes and directed edges in the configuration information are traversed. After the traversal is completed, multiple traversal paths can be obtained. By integrating these traversal paths, a query path list can be obtained.

In this way, the connection relationship between each information node and its upstream and downstream information nodes can be taken into account, thus avoiding the omission of traversal paths. In this way, the generated query path list is more complete and accurate.

In one example, generating a script file corresponding to each query path according to a constraint condition of each information node corresponding to each query path in S24, specifically, the content described in the following operations S241 and S242 may be included.

S241: Determining a constraint condition corresponding to a directed edge of each information node corresponding to each query path.

In this embodiment, the constraint condition includes a filter condition, a filter function and a filter logic configured for filtering the information nodes; and Please refer to the above configuration file. The filter condition can be "propertyKey": "Company#name", the filter function can be "rule": "TextP.containing", and the filter logic can be "filterLogic": "AND". In addition, the constraint condition can further include variable types "paraType": "CONSTANT" and variable values "targetValue".

S242: Acquiring a comparison result of a constraint condition between each two adjacent information nodes corresponding to each query path, and generating a cypher script corresponding to each query path based on the comparison result.

When determining the comparison result, the filter conditions, filter functions, filter logic, variable types, and variable values in the constraint condition between two adjacent information nodes can be compared one by one, if the comparison result is the same, the assignment value is "1", and if the comparison result is different, the assignment value is "0", and then the cypher script corresponding to each query path is generated based on the string formed by the assignment.

In this embodiment, cypher is a descriptive graphical query language that allows expressive and efficient queries for graphical storage without having to write traversal code for graphical structures. Further, the structure of the above cypher script file is shown in the following table.

TABLE 1

| Field Name | Type | Remarks |
| --- | --- | --- |
| id | bigint | id |
| name | varhar(255) | indicator name |
| config_json | longtext | configuration json |
| cypher_script | text | cypher script |

Further, the server 200 can store each of the above-mentioned cypher script files in the first database server 500 to configure the cypher script file, so as to facilitate the subsequent direct call to the cypher script file for information query On the basis of the above, executing a target script file corresponding to the fourth identification information in a second database server to obtain a query result corresponding to the third identification information in S25, specifically, the content described in the following operations S251-S256 may be included.

S251: Acquiring a first thread information configured for generating the cypher script and a second thread information of a script execution thread of the second database server.

In this embodiment, the first thread information includes structured description information of the cypher script. The second thread information includes the encoding information that starts the script execution thread of the second database server.

S252: Extracting respectively a first thread parameter set of the first thread information and a second thread parameter set of the second thread information.

In this embodiment, the first thread parameter set and the second thread parameter set both include a plurality of thread parameters with different response times. When the server 200 and the second database server 600 call their respective thread parameters, the response time is configured to characterize the traversing duration of each thread parameter.

S253: Acquiring a parameter correlation of any thread parameter of the first thread parameter set, and determining a thread parameter with a minimum response time in the second thread parameter set as a reference parameter.

In this embodiment, the parameter correlation is configured to characterize the influence weight of thread parameters in the first thread parameter set, and the parameter correlation may be a value between 0 and 1, and the greater the parameter correlation, the greater the influence weight of the thread parameter in the first thread parameter set.

S254: Calculating a mapping correlation of the parameter correlation with respect to the reference parameter, and generating compensation information between the first thread information and the second thread information for thread pairing based on the parameter correlation and the mapping correlation.

In this embodiment, the mapping correlation can be calculated by using a preset mapping relationship. For example, if the parameter correlation is q1 and the mapping relationship is f, the mapping correlation can be q2=f(q1). Where f is mapping function.

In this embodiment, the compensation information may be pointing information that adaptively adjusts field names, types, and remarks in Table 1.

S255: Determining a first mapping file of the target script file in the first thread information, and taking the compensation information to compensate the first mapping file to obtain a second mapping file.

In this embodiment, the compensation information can be configured to adjust the corresponding field name encoding value, type encoding value, and remark encoding value in the first mapping file, thus ensuring compatibility between the second mapping file and the second database server 600.

S256: Importing the second mapping file into the script execution thread of the second database server to run the script execution thread by the second database server, and obtaining the query result corresponding to the third identification information.

In this embodiment, the query result can be output in a visual form. For example, company A's annual performance report can be presented in the form of a bar chart or pie chart.

Based on the above method, the calculation of indicator information can be logically expressed by the browser 301 configuration, thus forming the configuration information in json format. Then the cypher script file (query statement) that can be directly executed the second database server 600 is determined according to the configuration information. In this way, when the user makes an information query, only the identification information of the query, such as the query object and the query target are needed, the server 200 can retrieve the corresponding cypher script file from the first database server 500 according to the query object and query target and execute the corresponding cypher script file in the second database server 600 to obtain the query result. In this way, there is no need for the user to manually write query statements through the terminal device, which reduces the requirements for users to query using the database.

Figure 3:
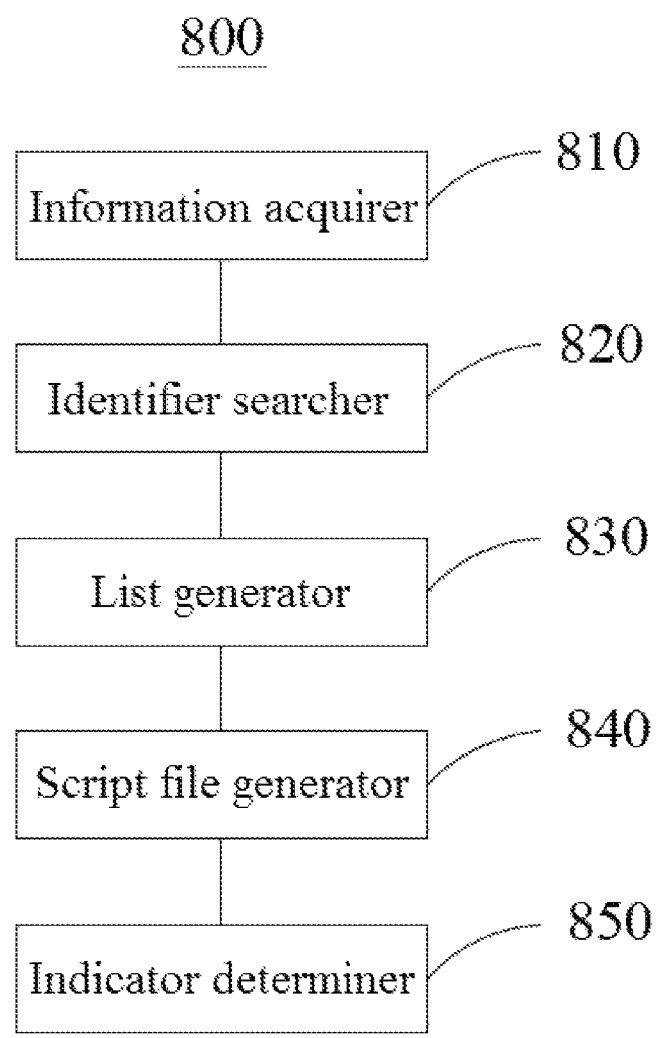
FIG. 3 is a schematic structural diagram of an apparatus of indicator information determination according to an embodiment of the present disclosure.

On the basis of the above, referring to FIG. 3, an apparatus of indicator information determination 800 is further provided. The apparatus includes: a memory 1005, a processor 1001, and an indicator information determination program stored on the memory 1005 and executable on the processor 1001, the indicator information determination program including:

an information acquirer 810 configured for acquiring configuration information sent by the browser, where the configuration information is obtained by the browser performing data format conversion on indicator information entered by a user, and a data format of the configuration information is json format;

an identifier searcher 820 configured for searching whether a second identification information that is the same as a first identification information in the configuration information exists in a first database server;

a list generator 830 configured for when the second identification information does not exist in the first database server, generating a query path list according to information nodes in the configuration information and connection relationship of the information nodes, where the query path list includes a plurality of elements, each of the plurality of elements characterizes a query path, and each query path includes a plurality of interconnected information nodes;

a script file generator 840 configured for generating a script file corresponding to each query path according to a constraint condition of each information node corresponding to each query path, and storing the script file in the first database server, where each script file corresponds to an identification information; and an indicator determiner 850 configured for receiving a query request input by a terminal device, searching whether a fourth identification information that is the same as a third identification information of the query request exists in the first database server, when the fourth identification information exists in the first database server, executing a target script file corresponding to the fourth identification information in a second database server to obtain a query result corresponding to the third identification information, and returning the query result to the terminal device.

Optionally, the identifier searcher 820 is further configured for:

when the second identification information exists in the first database server, sending an error prompt message to the browser.

Optionally, the list generator 830 is further configured for:

determining an information node with a setting node identification in the configuration information as an initial information node, where the initial information node is connected through a plurality of directed edges;

traversing a downstream information node corresponding to each of the plurality of directed edges of the initial information node, and obtaining a plurality of traversal paths corresponding to the initial information node; and integrating the plurality of traversal paths to obtain the query path list.

Optionally, the script file generator 840 is further configured for:

determining a constraint condition corresponding to a directed edge of each information node corresponding to each query path, where the constraint condition includes a filter condition, a filter function and a filter logic configured for filtering the information nodes; and acquiring a comparison result of a constraint condition between each two adjacent information nodes corresponding to each query path, and generating a cypher script corresponding to each query path based on the comparison result.

Optionally, the indicator determiner 850 is further configured for:

acquiring a first thread information configured for generating the cypher script and a second thread information of a script execution thread of the second database server;

extracting respectively a first thread parameter set of the first thread information and a second thread parameter set of the second thread information, where the first thread parameter set and the second thread parameter set both include a plurality of thread parameters with different response times;

acquiring a parameter correlation of any thread parameter of the first thread parameter set, and determining a thread parameter with a minimum response time in the second thread parameter set as a reference parameter, where the parameter correlation is configured for characterizing an influence weight of the thread parameter in the first thread parameter set;

calculating a mapping correlation of the parameter correlation with respect to the reference parameter, and generating compensation information between the first thread information and the second thread information for thread pairing based on the parameter correlation and the mapping correlation;

determining a first mapping file of the target script file in the first thread information, and taking the compensation information to compensate the first mapping file to obtain a second mapping file; and importing the second mapping file into the script execution thread of the second database server to run the script execution thread by the second database server, and obtaining the query result corresponding to the third identification information, where the second database server is a Janus-Graph database.

For the description of the above operations, please refer to the description of the above operations S21-S26, which will not be further explained here.

In summary, when applying the above scheme provided in the present disclosure, the script file corresponding to a query statement is determined based on the configuration file in advance, and the user does not need to write the query statement by himself. In this way, the script file in the first database server can be executed in the second database server directly according to the identification information in the user's query request to obtain the query result. At the same time, it can ensure that users who do not have the ability to write query statements can also quickly query graph analysis indicator information through the graph database, which reduces the requirements for users to query graph analysis indicator information through the graph database. In addition, since it is not necessary to obtain the query statement entered by the user, the server does not need to expose the interface of the development side to the terminal device, which can ensure the data security of the server.

The above are only some embodiments of the present disclosure and are not used to limit the present disclosure. For those skilled in the art, the present disclosure may have various changes and variations. Any modification, equivalent replacement, improvement, etc. made within the spirit and principle of the present disclosure shall be included in the scope of the claims of the present disclosure.

What is claimed is:

1. A method of indicator information determination, applied to a server communicating with a user terminal with a browser installed, the method comprising:

acquiring configuration information sent by the browser, wherein the configuration information is obtained by the browser performing data format conversion on indicator information entered by a user, and a data format of the configuration information is json format;

searching whether a second identification information that is the same as a first identification information the configuration information exists in a first database server;

when the second identification information does not exist in the first database server, generating a query path list according to information nodes in the configuration information and connection relationship of the information nodes, wherein the query path list comprises a plurality of elements, each of the plurality of elements characterizes a query path, and each query path comprises a plurality of interconnected information nodes;

generating a script file corresponding to each query path according to a constraint condition of each information node corresponding to each query path, and storing the script file in the first database server, wherein each script file corresponds to an identification information; and receiving a query request input by a terminal device, searching whether a fourth identification information that is the same as a third identification information of the query request exists in the first database server, when the fourth identification information exists in the first database server, executing a target script file corresponding to the fourth identification information in a second database server to obtain a query result corresponding to the third identification information, and returning the query result to the terminal device, wherein the query result comprises indicator information corresponding to the third identification information;

wherein, generating a script file corresponding to each query path according to a constraint condition of each information node corresponding to each query path comprises:

determining a constraint condition corresponding to a directed edge of each information node corresponding to each query path, wherein the constraint condition comprises a filter condition, a filter function and a filter logic configured for filtering the information nodes; and acquiring a comparison result of a constraint condition between each two adjacent information nodes corresponding to each query path, and generating a cypher script corresponding to each query path based on the comparison result.

2. The method of claim 1, further comprising:
when the second identification information exists in the first database server, sending an error prompt message to the browser.

3. The method of claim 1, wherein generating a query path list according to information nodes in the configuration information and connection relationship of the information nodes comprises:

determining an information node with a setting node identification in the configuration information as an initial information node, wherein the initial information node is connected through a plurality of directed edges;

traversing a downstream information node corresponding to each of the plurality of directed edges of the initial information node, and obtaining a plurality of traversal paths corresponding to the initial information node; and integrating the plurality of traversal paths to obtain the query path list.

4. The method of claim 1, wherein executing a target script file corresponding to the fourth identification information in a second database server to obtain a query result corresponding to the third identification information comprises:

acquiring a first thread information configured for generating the cypher script and a second thread information of a script execution thread of the second database server;

extracting respectively a first thread parameter set of the first thread information and a second thread parameter set of the second thread information, wherein the first thread parameter set and the second thread parameter set both comprise a plurality of thread parameters with different response times;

acquiring a parameter correlation of any thread parameter of the first thread parameter set, and determining a thread parameter with a minimum response time in the second thread parameter set as a reference parameter, wherein the parameter correlation is configured for characterizing an influence weight of the thread parameter in the first thread parameter set;

calculating a mapping correlation of the parameter correlation with respect to the reference parameter, and generating compensation information between the first thread information and the second thread information for thread pairing based on the parameter correlation and the mapping correlation;

determining a first mapping file of the target script file in the first thread information, and taking the compensation information to compensate the first mapping file to obtain a second mapping file; and importing the second mapping file into the script execution thread of the second database server to run the script execution thread by the second database server, and obtaining the query result corresponding to the third identification information, wherein the second database server is a JanusGraph database.

5. An apparatus of indicator information determination, applied to a server communicating with a user terminal with a browser installed, the apparatus comprising:

an information acquirer configured for acquiring configuration information sent by the browser, wherein the configuration information is obtained by the browser performing data format conversion on indicator information entered by a user, and a data format of the configuration information is json format;

an identifier searcher configured for searching whether a second identification information that is the same as a first identification information in the configuration information exists in a first database server;

a list generator configured for when the second identification information does not exist in the first database server, generating a query path list according to information nodes in the configuration information and connection relationship of the information nodes, wherein the query path list comprises a plurality of elements, each of the plurality of elements characterizes a query path, and each query path comprises a plurality of interconnected information nodes;

a script file generator configured for generating a script file corresponding to each query path according to a constraint condition of each information node corresponding to each query path, and storing the script file in the first database server, wherein each script file corresponds to an identification information; and an indicator determiner configured for receiving a query request input by a terminal device, searching whether a fourth identification information that is the same as a third identification information of the query request exists in the first database server, when the fourth identification information exists in the first database server, executing a target script file corresponding to the fourth identification information in a second database server to obtain a query result corresponding to the third identification information, and returning the query result to the terminal device, wherein the query result comprises indicator information corresponding to the third identification information;

wherein, the script file generator is further configured for:
determining a constraint condition corresponding to a directed edge of each information node corresponding to each query path, wherein the constraint condition comprises a filter condition, a filter function and a filter logic configured for filtering the information nodes; and
acquiring a comparison result of a constraint condition between each two adjacent information nodes corresponding to each query path, and generating a cypher script corresponding to each query path based on the comparison result.

6. The apparatus of claim 5, wherein the identifier searcher is further configured for:
when the second identification information exists in the first database server, sending an error prompt message to the browser.

7. The apparatus of claim 5, wherein the list generator is further configured for:
determining an information node with a setting node identification in the configuration information as an initial information node, wherein the initial information node is connected through a plurality of directed edges;
traversing a downstream information node corresponding to each of the plurality of directed edges of the initial information node, and obtaining a plurality of traversal paths corresponding to the initial information node; and
integrating the plurality of traversal paths to obtain the query path list.

8. The apparatus of claim 5, wherein the indicator determiner is further configured for:
acquiring a first thread information configured for generating the cypher script and a second thread information of a script execution thread of the second database server;
extracting respectively a first thread parameter set of the first thread information and a second thread parameter set of the second thread information, wherein the first thread parameter set and the second thread parameter set both comprise a plurality of thread parameters with different response times;
acquiring a parameter correlation of any thread parameter of the first thread parameter set, and determining a thread parameter with a minimum response time in the second thread parameter set as a reference parameter, wherein the parameter correlation is configured for characterizing an influence weight of the thread parameter in the first thread parameter set;
calculating a mapping correlation of the parameter correlation with respect to the reference parameter, and generating compensation information between the first thread information and the second thread information for thread pairing based on the parameter correlation and the mapping correlation;
determining a first mapping file of the target script file in the first thread information, and taking the compensation information to compensate the first mapping file to obtain a second mapping file; and
importing the second mapping file into the script execution thread of the second database server to run the script execution thread by the second database server, and obtaining the query result corresponding to the third identification information, wherein the second database server is a JanusGraph database.

* * * * *